US011320857B2

(12) United States Patent
Turner

(10) Patent No.: US 11,320,857 B2
(45) Date of Patent: May 3, 2022

(54) DEVICES AND SYSTEMS FOR PROTECTING ELECTRONIC DEVICES

(71) Applicant: Christian M. Turner, Kennesaw, GA (US)

(72) Inventor: Christian M. Turner, Kennesaw, GA (US)

( * ) Notice: Subject to any disclaimer, the term of this patent is extended or adjusted under 35 U.S.C. 154(b) by 0 days.

(21) Appl. No.: 17/111,496

(22) Filed: Dec. 3, 2020

(65) Prior Publication Data

US 2021/0165448 A1 Jun. 3, 2021

Related U.S. Application Data

(60) Provisional application No. 62/942,906, filed on Dec. 3, 2019.

(51) Int. Cl.
*G06F 1/16* (2006.01)
*A45C 11/00* (2006.01)

(52) U.S. Cl.
CPC ............ *G06F 1/1616* (2013.01); *A45C 11/00* (2013.01); *A45C 2011/002* (2013.01); *A45C 2011/003* (2013.01)

(58) Field of Classification Search
CPC .............. A45C 11/00; A45C 2011/002; A45C 2011/003; B65D 85/30; B65D 85/38; G06F 1/16; G06F 1/1615; G06F 1/1616
USPC ........................................................ 206/320
See application file for complete search history.

(56) References Cited

U.S. PATENT DOCUMENTS

| | | | | |
|---|---|---|---|---|
| 5,299,685 A | * | 4/1994 | Chin | B65D 81/02 206/320 |
| 5,583,742 A | | 12/1996 | Noda et al. | |
| 8,775,710 B1 | * | 7/2014 | Miller | G06F 1/1632 710/303 |
| 9,204,697 B2 | | 12/2015 | Yang | |
| 9,553,629 B2 | * | 1/2017 | Demnard | A45C 11/38 |
| 9,700,112 B1 | * | 7/2017 | Samson | A45C 11/00 |
| 10,291,757 B1 | | 5/2019 | Balourdet | |
| 2006/0042996 A1 | | 3/2006 | Picot et al. | |
| 2008/0259551 A1 | * | 10/2008 | Gavenda | G06F 1/1656 361/679.31 |
| 2011/0192743 A1 | | 8/2011 | May et al. | |
| 2014/0055943 A1 | * | 2/2014 | Chang | G06F 1/1658 361/679.35 |
| 2016/0338459 A1 | * | 11/2016 | Yow | A45C 13/02 |

FOREIGN PATENT DOCUMENTS

WO 2013069005 A2 5/2013

* cited by examiner

*Primary Examiner* — Bryon P Gehman
(74) *Attorney, Agent, or Firm* — Bekiares Eliezer LLP

(57) ABSTRACT

Disclosed herein are systems and devices of electronic device protection. A device for protecting an electronic device can include an inner and outer protective member. The outer protective member being configured to at least partially envelop a first corner of the electronic device, the outer protective member having at least one through hole extending therethrough, the at least one through hole being substantially orthogonal to a primary inner surface of the outer protective member, the outer protective member further having a notch configured to receive a portion of the first corner, the at least one notch being proximate the primary inner surface.

20 Claims, 14 Drawing Sheets

DEVICES AND SYSTEMS FOR PROTECTING ELECTRONIC DEVICES

RELATED APPLICATION

This application claims the benefit of priority to U.S. Provisional Patent Application Ser. No. 62/942,906, filed Dec. 3, 2019, which is hereby incorporated herein by reference in its entirety.

FIELD OF INVENTION

The present invention relates to devices, systems, and methods for protecting electronic devices.

BACKGROUND OF THE INVENTION

Generally, electronic devices may be protected by cases, appliques/films, overmolding, and other conventional methods. Cases and films are particularly popular options for many different electronic devices.

Films may be formed of one or more layers of plastic sheeting. An adhesive backing may be used to apply the sheet over the device. Some films are custom-cut for a particular model of device. Other films are intended to be trimmed by a consumer, which can cause unnecessary scratching or damage if done improperly.

Cases may be formed of silicon, plastic, mesh, rubber, and other materials. Cases may be manufactured based on an electronic device's dimensions (e.g., supplied to the manufacturer). Accordingly, specialized tooling, injection molding dies, and other product-specific tooling may be necessary to form a particular case. Thus, some lesser known devices, out-of-date devices, and/or very new or prototype devices may not have a suitable case being manufactured or available to purchase. Moreover, many cases are intended to be easily removed by a consumer, thereby increasing the likelihood that a case may be improperly installed or unintentionally removed, which may lead to damaging the electronic device.

Accordingly, there remains a need for modular & secure protective devices and systems for electronic device protection that overcome these and other drawbacks. These and other needs are satisfied by the various aspects of the present disclosure.

SUMMARY OF THE INVENTION

In accordance with the purposes of the invention, as embodied and broadly described herein, the invention, in one aspect, relates to devices and systems for protecting electronic devices, such as, for example, laptops and tablet computers.

In another aspect, the invention relates to a device for protecting an electronic device. The device for protecting an electronic device can include an outer protective member, the outer protective member being configured to at least partially envelop a first corner of the electronic device, the outer protective member having at least one through hole extending therethrough, the at least one through hole being substantially orthogonal to a primary inner surface of the outer protective member, the outer protective member further having a notch configured to receive a portion of the first corner, the at least one notch being proximate the primary inner surface. The device can also include a first layer of protective film attached to the primary inner surface adjacent the notch, and an inner protective member, the inner protective member being configured to be attached to the outer protective member such that a portion of an inner surface of the inner protective member is adjacent a secondary inner surface of the outer protective member, such that a remaining portion of the inner surface is adjacent a surface of the electronic device, and such that a threaded hole in the inner surface is in alignment with the at least one through hole. The device can also include a second layer of protective film attached to the inner surface of the inner protective member.

In another aspect, the invention relates to a device for protecting an electronic device. The device for protecting an electronic device can include an outer protective member, the outer protective member being configured to at least partially envelop a first edge of the electronic device, the outer protective member having at least one through hole extending therethrough, the at least one through hole being substantially orthogonal to a primary inner surface of the outer protective member, the outer protective member further having a notch configured to receive a portion of the first edge, the at least one notch being proximate the primary inner surface. The device can also include a first layer of protective film attached to the primary inner surface adjacent the notch, and an inner protective member, the inner protective member being configured to be attached to the outer protective member such that a portion of an inner surface of the inner protective member is adjacent a secondary inner surface of the outer protective member, such that a remaining portion of the inner surface is adjacent a surface of the electronic device, and such that a threaded hole in the inner surface is in alignment with the at least one through hole. The device can also include a second layer of protective film attached to the inner surface of the inner protective member. Accordingly, according to this aspect, the device is not restricted to being placed on solely a corner but may partially envelop any edge of the electronic device.

In another aspect, the invention relates to a system for protecting an electronic device. The system can include two (2), four (4), six (6), or more protective devices as described herein. The protective devices may be clamped about the electronic device in any desired protective positions. The clamping may be facilitated by the threaded holes and through holes of the devices. Furthermore, the clamping using fasteners requiring a tool may limit the ability to remove one of the protective devices, thereby reducing the possibility of unintentionally removing the protective devices.

In still further aspects, the invention also relates to methods for using the disclosed devices and systems.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1:
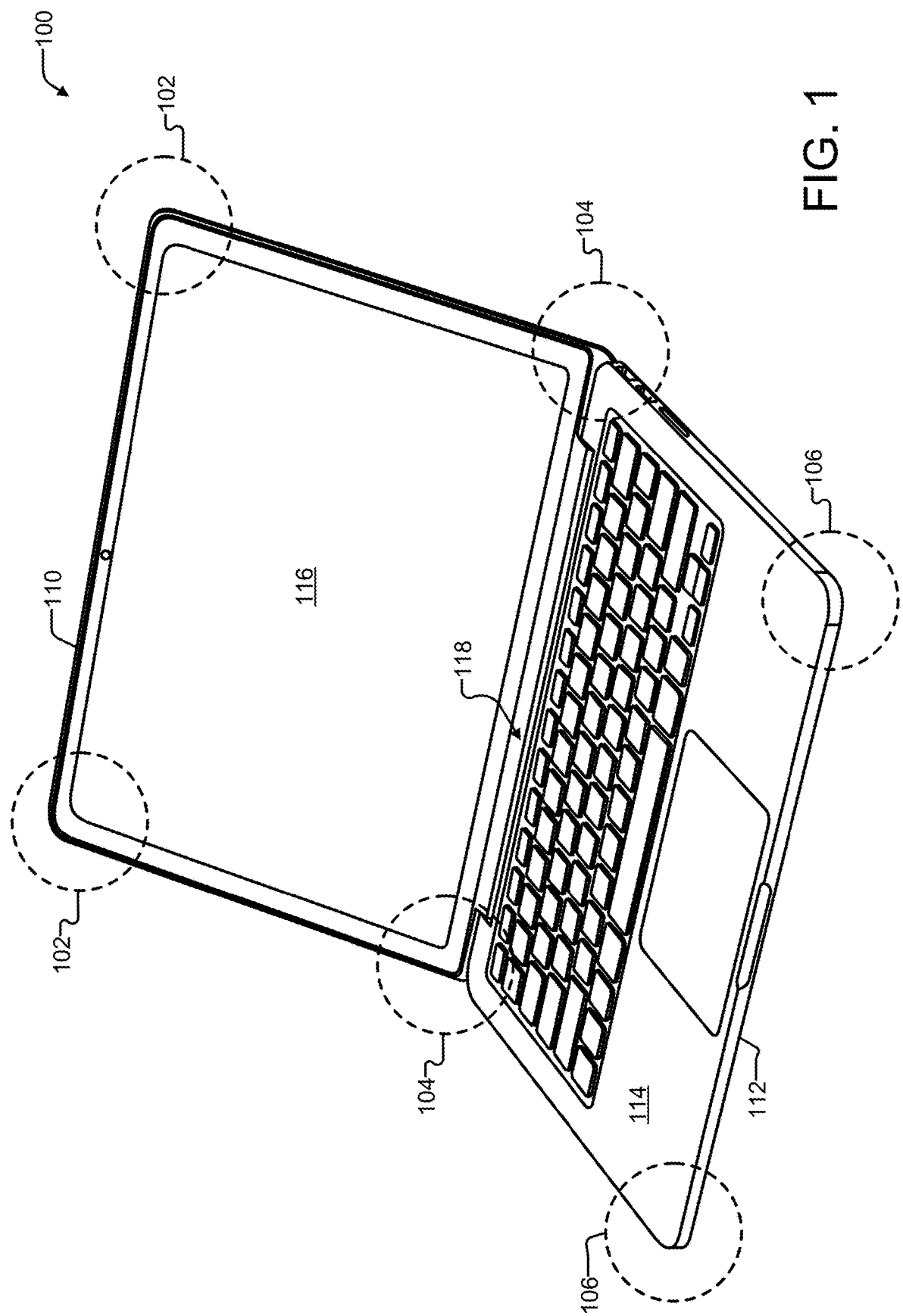
FIG. 1 illustrates an electronic device in an open configuration.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Any and all publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an assembly" includes two or more assemblies.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

As used herein, the term "protective" is used to describe various devices and components of said devices. No defined level of protection is provided as varying levels are possible through application of additional protective devices. Furthermore, although one device may be termed protective, and another simply device, there is no implication of the normal device not being protective. As such, the phrases "device for protecting," "device to protect," "protective device," and other similar phrases are used interchangeably herein to describe devices.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Devices and Systems for Protecting Electronic Devices Overview

As briefly described above, the present disclosure relates, in various aspects, to devices and systems for protecting electronic devices, such as a laptop, tablet, smartphone, or the like. In further aspects, the disclosed devices and systems can be used in any desired device type.

In one aspect, the present disclosure provides a system for protecting electronic devices, including four or more modular protection devices. Each modular protection device (which may also be referred to herein as "edging") includes an outer protective member, an inner protective member, one or more connecting mechanism or fasteners, and one or more layers of protective film. The device may also comprise an electrostatic discharges (ESD) material between clamping portion to protect the electronic device from static.

In another aspect, the present disclosure provides a device for protecting an electronic device, the device comprising: a protective assembly comprising an outer protective member configured to detachably couple with an inner protective member. The outer protective member may be configured to at least partially envelop a first surface of the electronic device, such as the outer surface or inner surface. The outer protective member may include a primary inner surface configured to contact the first surface and a secondary inner surface adjacent to the primary inner surface and configured to contact or connect with an inner surface of the inner protective member, and a notch configured to receive at least a portion of the first surface.

In further aspects, the primary inner surface corresponds to a surface of the notch of the outer protective member, or the portion of the inner surface contacting the inner surface of the electronic device. Each protective member may comprise at least one through hole extending therethrough, such as the outer protective member comprises at least one through hole extending therethrough. In still further aspects, the at least one through hole may be orthogonal or substantially orthogonal to a secondary inner surface of the outer protective member. In some aspects, a notch may comprise or correspond to the primary inner surface.

In further aspects, the devices or members may further comprise at least one protective film attached to one or more inner surfaces of one or more protective members, such as a first layer of protective film attached to the primary inner surface of the outer protective member. In still further aspects, a portion of the inner surface of the inner protective member may be adjacent to the secondary inner surface of the outer protective member. In yet further aspects, a remaining portion of the inner surface may be adjacent to a surface of the electronic device.

In further aspects, an inner protective member may comprise at least one threaded hole extending therethrough, the at least one threaded hole is in alignment with the at least one through hole. The inner protective surface may further comprise a second layer of protective film attached to the inner surface of the inner protective member. In some aspects, the inner surface of the inner protective member is planar or substantially planar. In other aspects, the inner protective member may comprise a primary inner surface configured to contact a surface of the electronic device and a secondary inner surface adjacent to said primary inner surface and configured to contact or connect with a secondary inner surface of an outer protective member.

In further aspects, a portion of the inner surface of the inner protective member and a portion of the inner surface of the outer protective member are configured to couple when the said inner and outer protective members are connected to one another. Still further, a secondary inner surface of the inner protective member may be configured to be disposed against a secondary inner surface of the outer protective member when the said inner and outer protective members are connected to one another. In still further aspects, an entire or substantially entire face of a secondary inner surface of the inner protective member is configured to be disposed against an entire or substantially entire secondary inner surface of the outer protective member when the said inner and outer protective members are connected to one another.

In further aspects, when the said inner and outer protective members are connected to one another can be when the said inner and outer protective members are connected to one another and installed on the electronic device. In still further aspects, the portion of the inner surface of the inner protective member and the portion of the inner surface of the outer protective member that are configured to couple further may comprise a connecting means or connecting mechanism disposed on both portions. The connecting mechanism may comprise an interlocking mechanism or magnets, or the like. In some aspects, the interlocking mechanism may comprise interlocking nodes, snap fit fasteners, a tongue and groove surface construction, or the like. In other aspects, the connecting mechanism may be configured to interlock effective to hold or strengthen coupled inner and outer protective member during installation on the electronic device. Magnets may be used for holding the edges together, clamping the top and bottom layer together, and or instead of screws in certain functional areas.

In various aspects, the device and protective member may be configured to be cut or sized reduced for customization purposes, such as to fit the length of an edge of the device. The device can also further comprise a band or cord, such as silicone cord or band) configured to connect adjacent protective members. The band may be configured to connect adjacent inner and outer protective members, such as where the band may be configured to wrap around edges to strengthen hold together once inner and outer protective members are clamped to the electronic device.

In various aspects, the present disclosure also provides a system comprising a plurality of disclosed protective device. In further aspect, the plurality of protective devices may comprise an outer protective member comprising: at least one through hole extending therethrough, wherein the at least one through hole is substantially orthogonal to a secondary inner surface of the outer protective member, a notch configured to receive a portion of the first electronic device, wherein the notch is proximate the primary inner surface, a primary inner surface of the outer protective member, the secondary inner surface of the outer protective member, and a first layer of protective film attached to the primary inner surface adjacent the notch; and at least one inner protective member configured to be attached to the outer protective member comprising: an inner surface of the inner protective member, wherein a portion of the inner surface of the inner protective member is adjacent the secondary inner surface of the outer protective member, wherein a remaining portion of the inner surface is adjacent a surface of the electronic device, at least one threaded hole extending therethrough, wherein the at least one threaded hole is in alignment with the at least one through hole, and a second layer of protective film attached to the inner surface of the inner protective member. In some aspects, at least one of the plurality of protective devices may be configured to at least partially envelop a corner of the electronic device. In other aspects, at least one of the plurality of protective devices may be configured to at least partially envelop a side portion of the electronic device. In further aspects, at least one of the plurality of protective devices may be configured to at least partially envelop a corner of the electronic device is configured to connect to the at least one of the plurality of protective devices configured to at least partially envelop a side portion of the electronic device when the electronic device is in a folded position. In still further aspects, the system may comprise two or more protective devices, such as 3, 4, 5, 6, 7, 8, 9, 10, 11, or more protective devices.

In various aspects, the component characteristics and configuration, such as, for example, size and dimensions, can be configured to adjust for various dimensions and other factors to achieve optimal operating parameter and electronic device types. In further aspects, features of the system and components may be configured or utilized to set and/or control the characteristics. For example, at least one of the following may be configured: the type of material used for the components; the member dimensions (e.g., height, width, length, thickness, etc.); the force transmission or reduction characteristics of the members; and the surface-contacting portion of the members.

In further aspects, while components of the disclosed system described herein may be permanently mounted in or on an electronic device, this is not preferred. For example, the protective members may be configured to be removably attached, e.g., to allow interchange and/or replacement. Such configurations allow users, or others to select desired properties or levels in a component, e.g., for customization purposes, for personal preferences, to match desired use conditions and device properties, or to repair or replace defective or damaged components, etc.

In various aspects, the components of the disclosed system and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

In various aspects, the inventive configuration and construction of the disclosed device and systems may comprise advantages over existing solutions. In further aspects, advantages may include, and without limitation, universal modular device edging for electronic devices not limited to size restrictions, free form edging that goes directly along the sides and/or lcd of a device, primary electronic device impact points are customizable by the end user and can protect the electronic device entirely without full enclosure of the electronic device, does not enclose the electronic device completely. For example, one embodiment of the protective device may include modular device edging that is attached to the electronic device through a series of screws and vise-like mechanisms that use an interlocking exterior shell made of plastic and/or aluminum that is multilayered to absorb impact. To this end, modular device edging does not require a top, bottom, or cover since edging attaches directly to the device itself and does not bind the device to any-type of specific enclosure as it attaches directly along the device itself. Furthermore, various embodiments may require a tool, such as specialized tool, for removal with a goal of protecting the device and preventing user tampering, which could leave the device exposed or at risk. In still further aspects, top edging may serve dual purpose by being able to acts as the bottom edging as well when the device is opened. Moreover, the configuration of the present invention does not fully cover or restrict device ports and openings, is customizable by the user, allowing them to add or remove as much coverage to the edge as they desire, does not requires bars or rails and does not fully enclose the device. Nevertheless, in various embodiments, the modular edging still secures directly to the device while preventing tampering. In further aspects, the modular device edging of the present invention uses a series of interchangeable and universal components that are not limited by the symmetry or shape of the electronic device. As such, the use of the present invention is not restricted to corner components or reliant on four corners.

C. Device and System Configuration

According to various aspects of the invention, the presses, devices and systems of the present disclosure can comprise multiple configurations. FIGS. 1-14 illustrate non-limiting examples of embodiments of operating environments, mechanisms, and components for the disclosed protective devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in a method or claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

Generally, and as described in detail herein, the outer and inner protective devices vary in shape and dimensions. However, various sizes, chosen from a set of available sizes, may be used to form a complete protection system via a mix-and-match of modular components. Turning now to the figures, individual components and details regarding the same are presented in detail.

Figure 2:
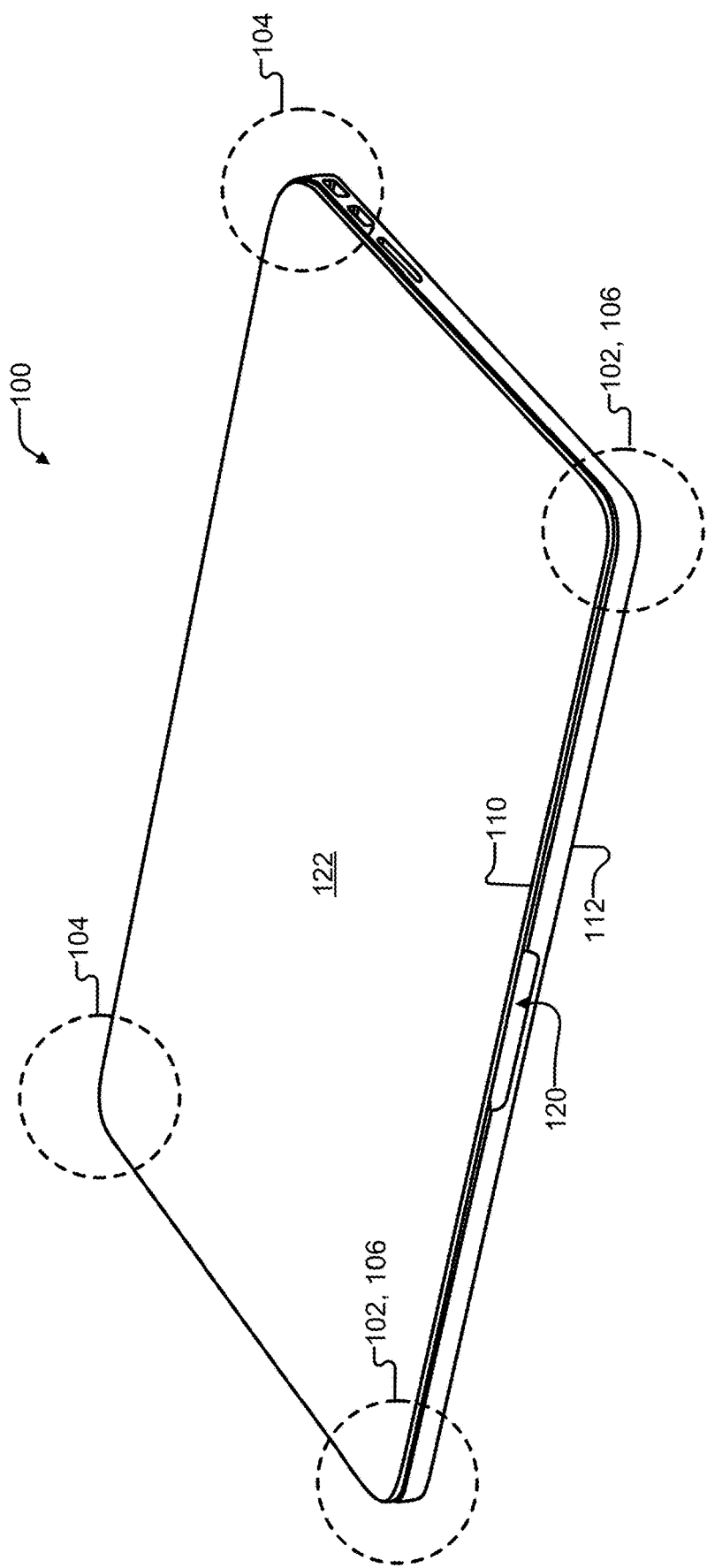
FIG. 2 illustrates the electronic device of FIG. 1 in a closed configuration.

FIG. 1 illustrates an electronic device 100 in an open configuration and FIG. 2 illustrates the electronic device 100 in a closed configuration. As shown, the electronic device 100 is a laptop, although any electronic device is applicable. The laptop 100 includes an upper clamshell portion 110 supporting screen 116. The laptop 100 further includes a lower clamshell portion 112 having surface 114 and foldably connected to the upper clamshell portion 110 by hinge 118.

The hinge 118 may be any appropriate hinge, including a hinge having a resistance sufficient to support the upper clamshell portion 110 in an open configuration. The surface 114 may be an exterior surface of a housing of the laptop 100. The housing may be formed of any material, including aluminum, plastic, magnesium, alloyed materials, and any other suitable material.

When in a closed configuration as shown in FIG. 2, the laptop 100 includes a gap 120 formed between the upper clamshell portion 110 and the lower clamshell portion 112. The gap may keep surface 114 from contacting screen 116 (opposite outer surface 122 of the laptop 100).

The laptop 100 generally includes six (6) points where most damage from a drop or fall begin, 102, 104, and 106. Upper failure points 102 are generally corners about the screen 116. Middle failure points 104 are generally corners about the screen 116 and surface 114. Lower failure points 116 are generally corners about the surface 114.

If the laptop 100 is dropped, and if any of the failure points 102, 104, and 106 are unprotected, the laptop may be damaged. However, if sufficient protection is provided, damage may be reduced as compared to an unprotected drop.

Figure 3:
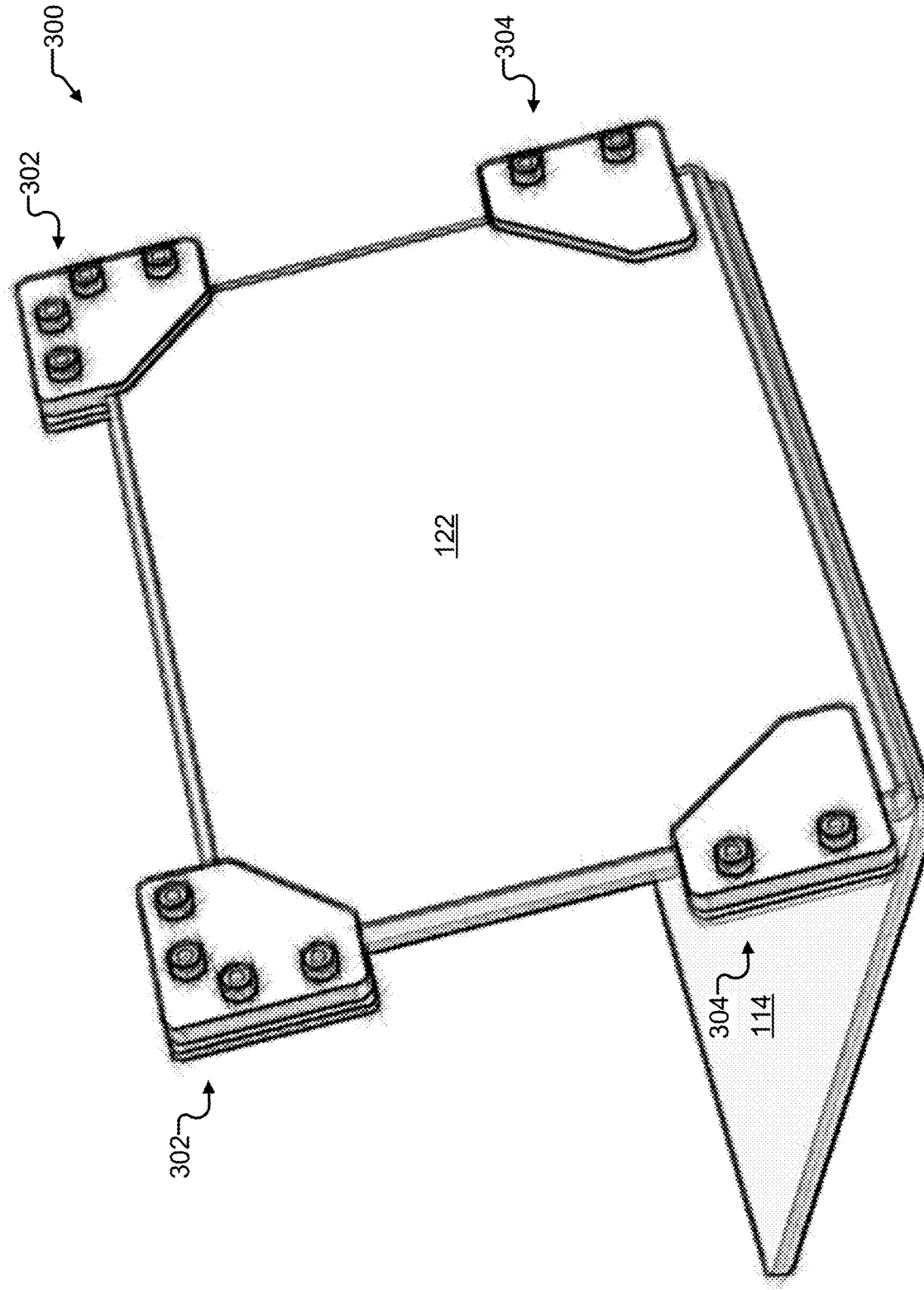
FIG. 3 illustrates a system for protecting an electronic device, according to an exemplary embodiment of the invention.
Figure 4:
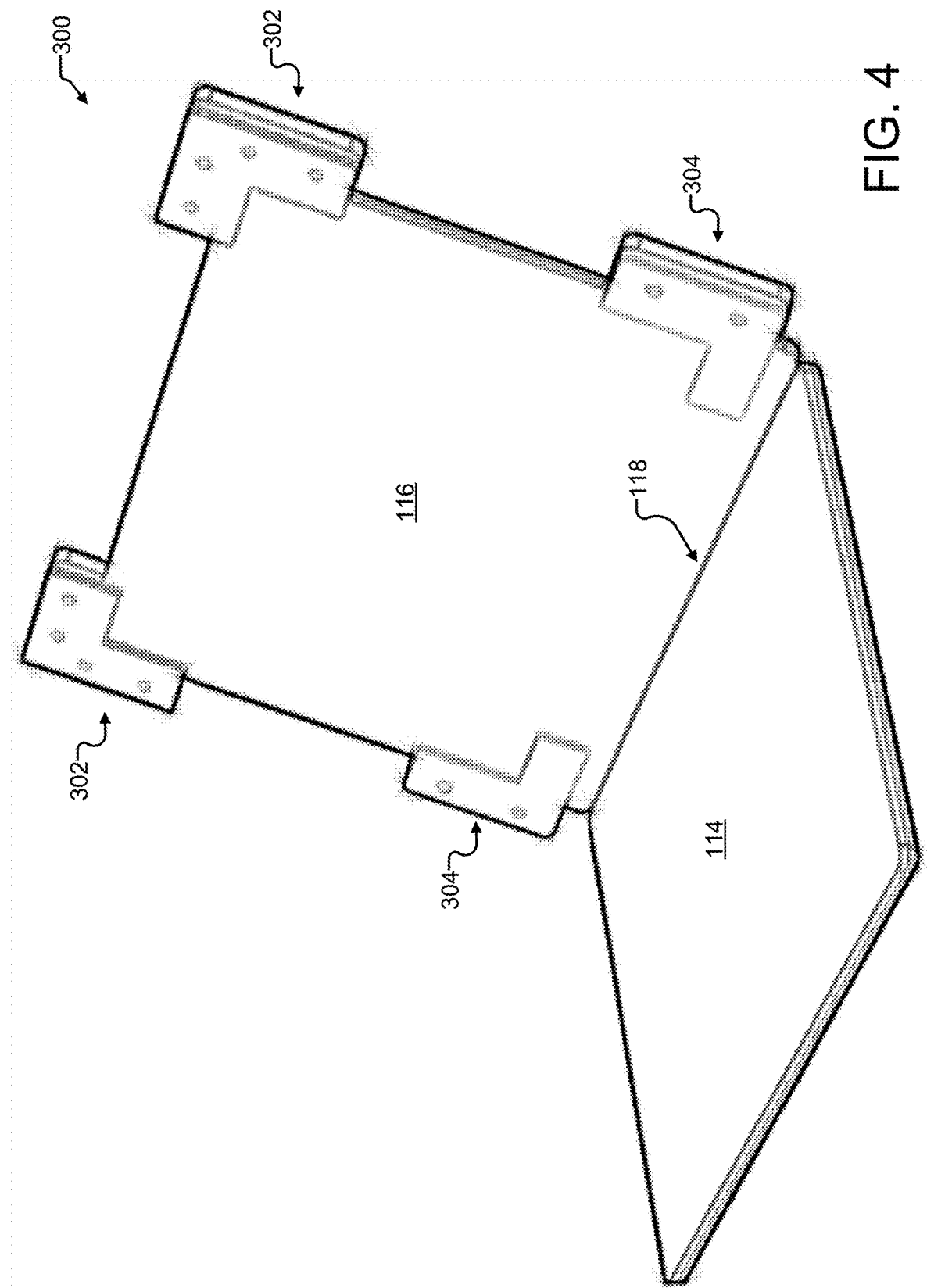
FIG. 4 illustrates a system for protecting an electronic device, according to an exemplary embodiment of the present invention.

FIGS. 3 and 4 illustrate a system 300 for protecting an electronic device, according to an exemplary embodiment of the invention. As illustrated, the laptop 100 may be retrofitted with protective devices 302, 304. Protective devices 302, 304 may clamp down onto the housing of the laptop 100 and protect the six noted failure points 102, 104, and 106.

It is noted that additional protective devices 302, 304 may be clamped about the housing of the laptop 100 to provide additional protection. The additional devices may be clamped onto corners, or edges, of the laptop 100.

Figure 5:
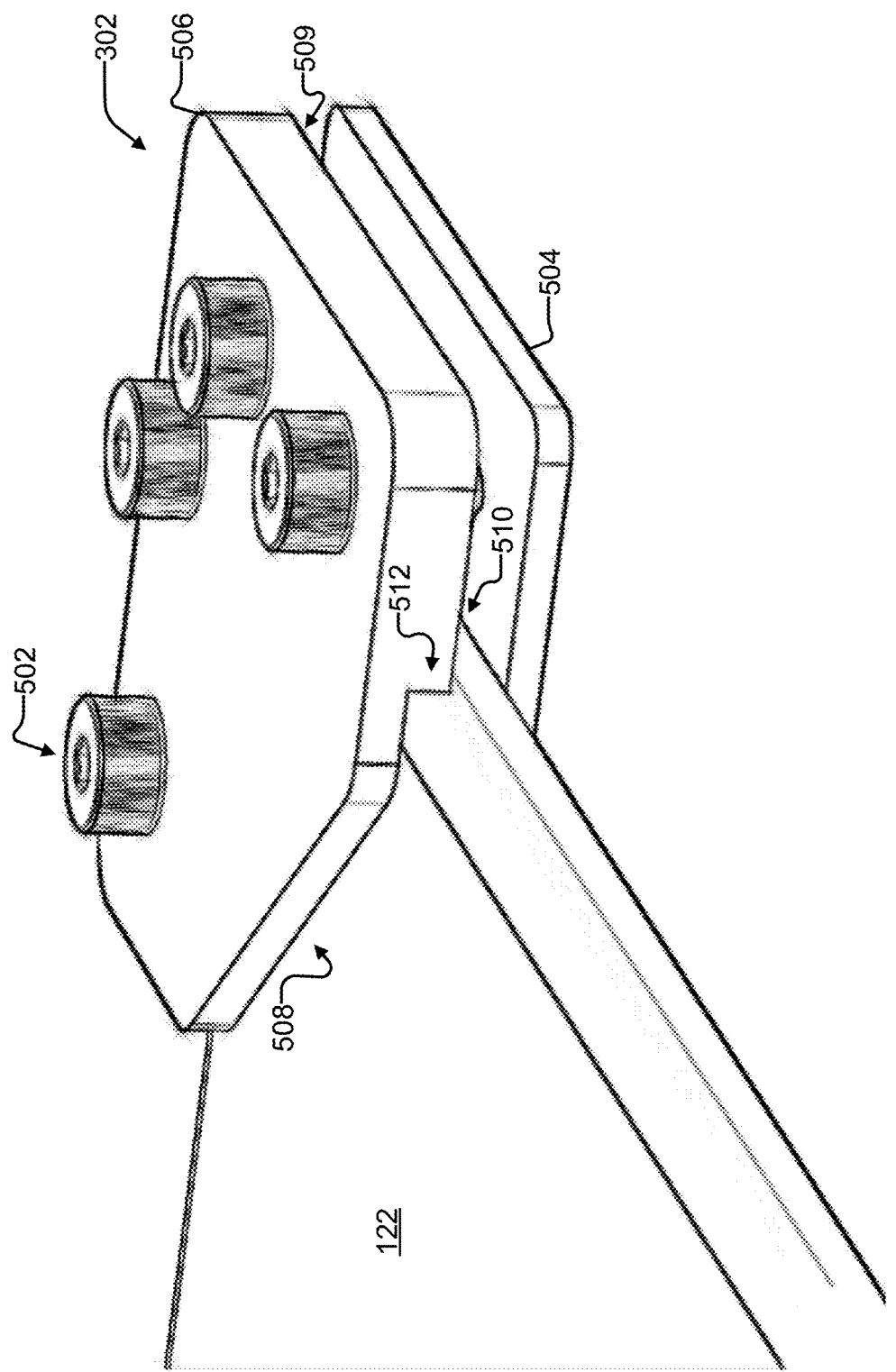
FIG. 5 illustrates a device for protecting an electronic device, according to an exemplary embodiment of the present invention.
Figure 7:
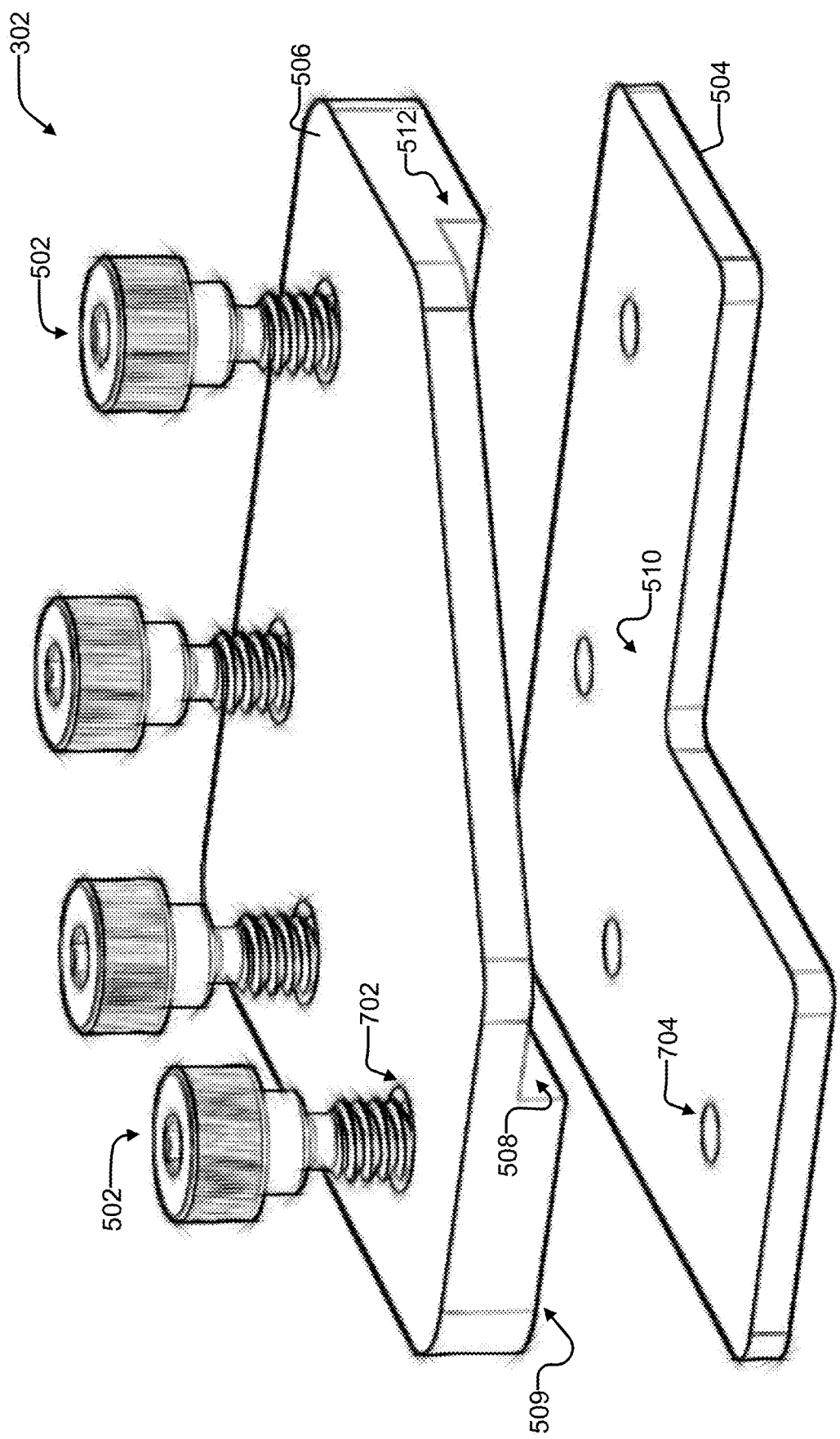
FIG. 7 illustrates an unassembled device for protecting an electronic device, according to an exemplary embodiment of the present invention.

FIG. 5 illustrates a device 302 for protecting an electronic device, and FIG. 7 illustrates an unassembled device 302, according to an exemplary embodiment of the present invention. As illustrated, the device 302 includes an outer protective member 506.

The outer protective member 506 is configured to at least partially envelop a first corner of the electronic device 100. For example, the outer protective member 506 is arranged to be positioned onto an exterior surface 122 such that the corner of the laptop 100 is surrounded.

The outer protective member 506 includes at least one through hole extending therethrough. The outer protective member 506 can include a primary inner surface 508, a secondary inner surface 509, and any number of through holes, however, and should not be limited to any particular number illustrated. The through hole is substantially orthogonal to a primary inner surface 508 of the outer protective member 506. The through hole is arranged to receive the fastener 502.

The outer protective member also includes notch 512. The notch 512 is configured to receive a portion of the first corner and is proximate the primary inner surface 508. The notch 512 is dimensioned to accept a plurality of corners and edges of a plurality of different models of electronic devices. Furthermore, the thickness of the notch 512 can be dimensioned to accept the thickness of a screen portion 116 of a laptop computer device.

Additionally, a first layer of protective film is attached to the primary inner surface 508 adjacent the notch 512. Although it is not illustrated in FIG. 5, it is noted that the first layer of protective film may be applied to the primary inner surface 508 to further protect the laptop 100 and surface 122 from scratches.

The device 302 also includes an inner protective member 504. The inner protective member 504 is configured to be attached to the outer protective member 506 such that a portion of an inner surface 510 of the inner protective member 504 is adjacent a secondary inner surface of the outer protective member 506. It is noted that under some scenarios, for example with a relatively thicker laptop housing, the inner surfaces of the device 302 may not be completely adjacent even when fully tightened. Furthermore, a thickness of the inner protective member 504 may be dimensioned to fit into the gap 120 formed between clamshell halves of a laptop computer device.

As shown, the fastener 502 for clamping down the device 100 is a screw or bolt. Any suitable type of fastener may be substituted, including, but not limited to, countersunk screws or bolts, threaded rods with nuts, pins, and other fasteners.

Additionally, when clamped down, a remaining portion of the inner surface 510 is adjacent a surface 116 of the electronic device 100, and a threaded hole in the inner surface 510 is in alignment with the at least one through hole to receive fastener 502. Furthermore, a second layer of protective film can be attached to the inner surface 510 of the inner protective member 504. According to one aspect, the first and second protective films are elastomeric and protect against scuffs and scratches. According to one aspect, the first and second protective films are rubberized tape, felt tape, plastic tape, or any suitable thin material with an adhesive backing for attaching onto the device 302, 304.

The device 302 and 304 may be formed of any suitable material. According to one aspect, the outer protective member 506 and the inner protective member 504 are formed of aluminum. According to another aspect, the outer protective member 506 and the inner protective member 504 are formed of molded plastic. According to another aspect, the outer protective member 506 and the inner protective member 504 are formed of metal, plastic, wood, rubber, or silicone. According to another aspect, the outer protective member 506 and/or inner protective member 504 can include an overmolded portion to add texture and grip to the device 302, 304. The outer protective member 506 and/or inner protective member 504 may also include differing layers of materials. One such layer may include a soft or pliable outer layer having a rigid interior configured to receive the fasteners 502.

Figure 6:
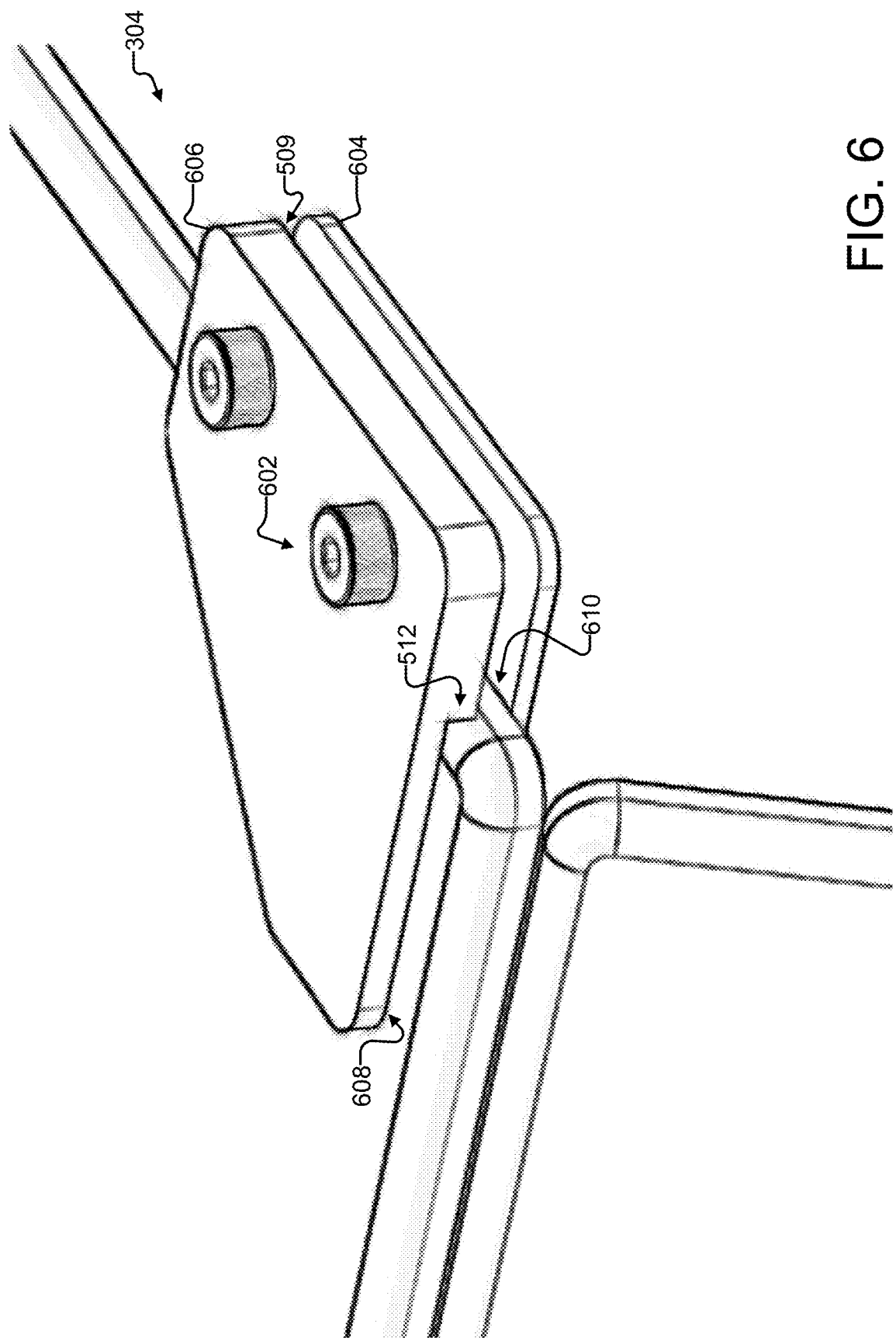
FIG. 6 illustrates a device for protecting an electronic device, according to an exemplary embodiment of the present invention.

FIG. 6 illustrates a device 304 for protecting an electronic device, according to an exemplary embodiment of the present invention. Device 304 is substantially similar to device 302, save for the notch 512.

As illustrated, the device 304 can include an outer protective member 606. The outer protective member 606 is configured to at least partially envelop a first edge of the electronic device 100. For example, the outer protective member 606 is arranged to be positioned onto an exterior surface 122 such that the edge of the laptop 100 is surrounded.

The outer protective member 606 includes at least one through hole extending therethrough. The outer protective member 606 can include a primary inner surface 608, a secondary inner surface 509, and any number of through holes, however, and should not be limited to any particular number illustrated. The through hole is substantially orthogonal to a primary inner surface 608 of the outer protective member 606. The through hole is arranged to receive the fastener 602.

The outer protective member also includes notch 612. The notch 612 is configured to receive a portion of the first edge and is proximate the primary inner surface 608. The notch 612 is dimensioned to accept a plurality of edges of a plurality of different models of electronic devices. Furthermore, the thickness of the notch 612 can be dimensioned to accept the thickness of a screen portion 116 of a laptop computer device.

Additionally, a first layer of protective film is attached to the primary inner surface 608 adjacent the notch 612. Although it is not illustrated in FIG. 6, it is noted that the first layer of protective film may be applied to the primary inner surface 608 to further protect the laptop 100 and surface 122 from scratches.

The device 302 also includes an inner protective member 604. The inner protective member 604 is configured to be attached to the outer protective member 606 such that a portion of an inner surface 610 of the inner protective member 604 is adjacent a secondary inner surface of the outer protective member 606. It is noted that under some scenarios, for example with a relatively thicker laptop housing, the inner surfaces of the device 302 may not be completely adjacent even when fully tightened. Furthermore, a thickness of the inner protective member 604 may be dimensioned to fit into the gap 120 formed between clamshell halves of a laptop computer device.

As shown, the fastener 602 for clamping down the device 100 is a screw or bolt. Any suitable type of fastener may be substituted, including, but not limited to, countersunk screws or bolts, threaded rods with nuts, pins, and other fasteners.

Additionally, when clamped down, a remaining portion of the inner surface 610 is adjacent a surface 116 of the electronic device 100, and a threaded hole in the inner surface 610 is in alignment with the at least one through hole to receive fastener 602. Furthermore, a second layer of protective film can be attached to the inner surface 610 of the inner protective member 604. According to one aspect, the first and second protective films are elastomeric and protect against scuffs and scratches. According to one aspect, the first and second protective films are rubberized tape, felt tape, plastic tape, or any suitable thin material with an adhesive backing for attaching onto the device 302, 304.

The device 302 and 304 may be formed of any suitable material. According to one aspect, the outer protective member 606 and the inner protective member 604 are formed of aluminum. According to another aspect, the outer protective member 606 and the inner protective member 604 are formed of molded plastic. According to another aspect, the outer protective member 606 and the inner protective member 604 are formed of metal, plastic, wood, rubber, or silicone. According to another aspect, the outer protective member 606 and/or inner protective member 604 can include an overmolded portion to add texture and grip to the device 302, 304. The outer protective member 606 and/or inner protective member 604 may also include differing layers of materials. One such layer may include a soft or pliable outer layer having a rigid interior configured to receive the fasteners 602.

Figure 8:
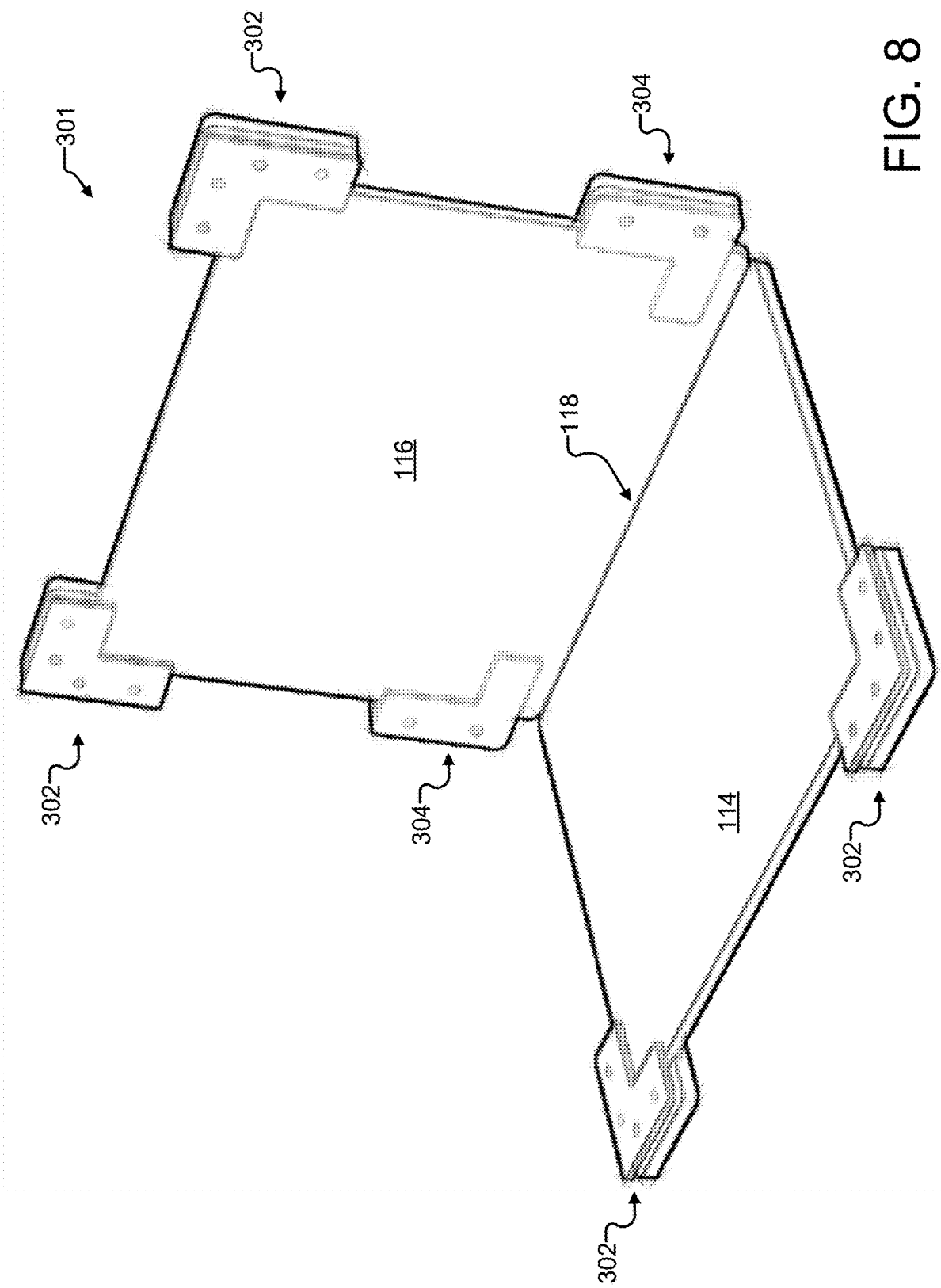
FIG. 8 illustrates a system for protecting an electronic device, according to an exemplary embodiment of the present invention.

FIG. 8 illustrates a system 301 for protecting an electronic device 100, according to an exemplary embodiment of the present invention. As illustrated, the system 301 is substantially similar to the system 300. The system 301 includes an additional two (2) protective devices 302 for protecting failure points 106.

Figure 9:
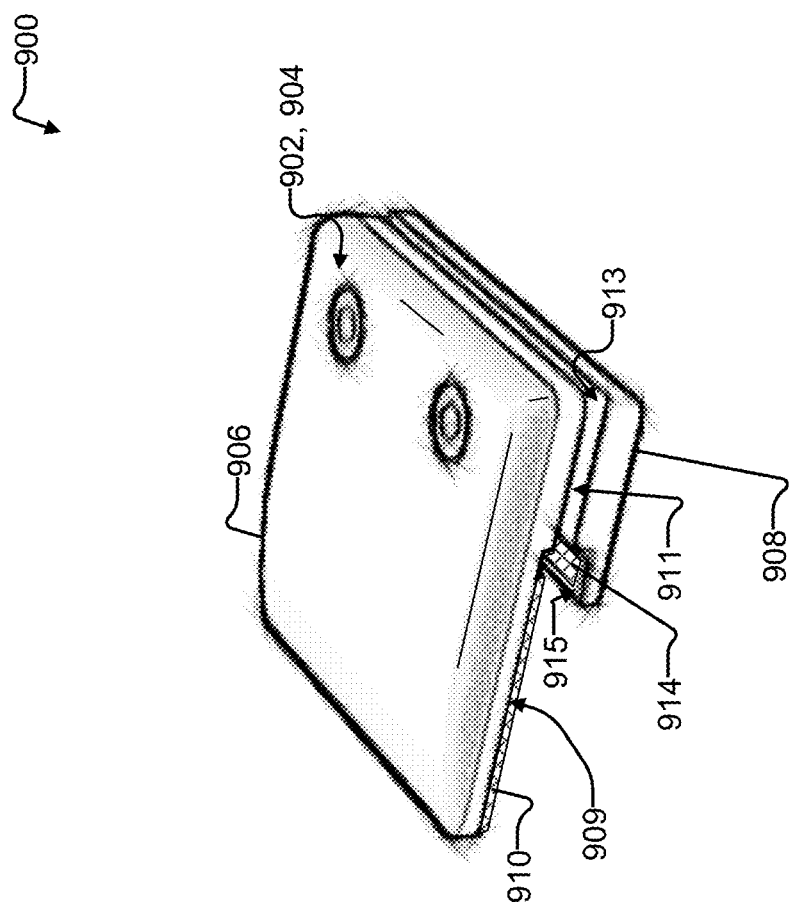
FIG. 9 illustrates a device for protecting an electronic device, according to an exemplary embodiment of the present invention.

FIG. 9 illustrates a device 900 for protecting an electronic device 100, according to an exemplary embodiment of the present invention. The device 900 is similar to device 304. The device 900 includes an outer protective member 906 having a primary inner surface 909 and a secondary inner surface 911, and inner protective member 908 having a primary inner surface 915 and a secondary inner surface 913.

The device 900 may be clamped down onto an electronic device using fasteners 902 arranged in countersunk through holes 904 and associated threaded holes on the inner protective member 908.

The device 900 also includes first and second protective films 910, 914, respectively. Each of the first and second protective films 910, 914 may be attached to inner surfaces of the device 900 to help in reducing scratches or scuffs.

Figure 10:
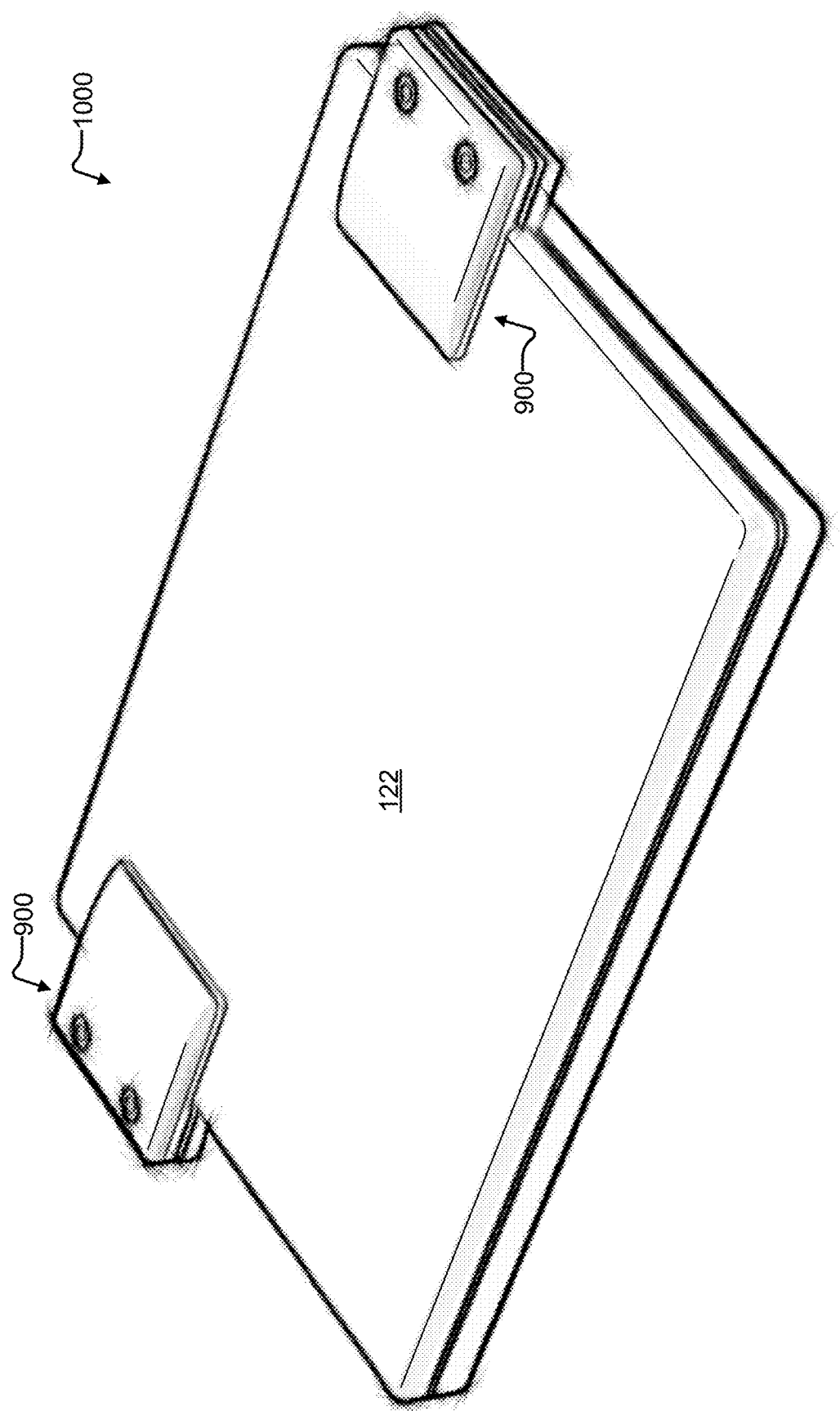
FIG. 10 illustrates a system for protecting an electronic device, according to an exemplary embodiment of the present invention.

FIG. 10 illustrates a system 1000 for protecting an electronic device 900, according to an exemplary embodiment of the present invention. As shown, two devices 900 are arranged to protect the device 100. Each device 900 has been positioned to protect the device 100 from side-damage.

Figure 11:
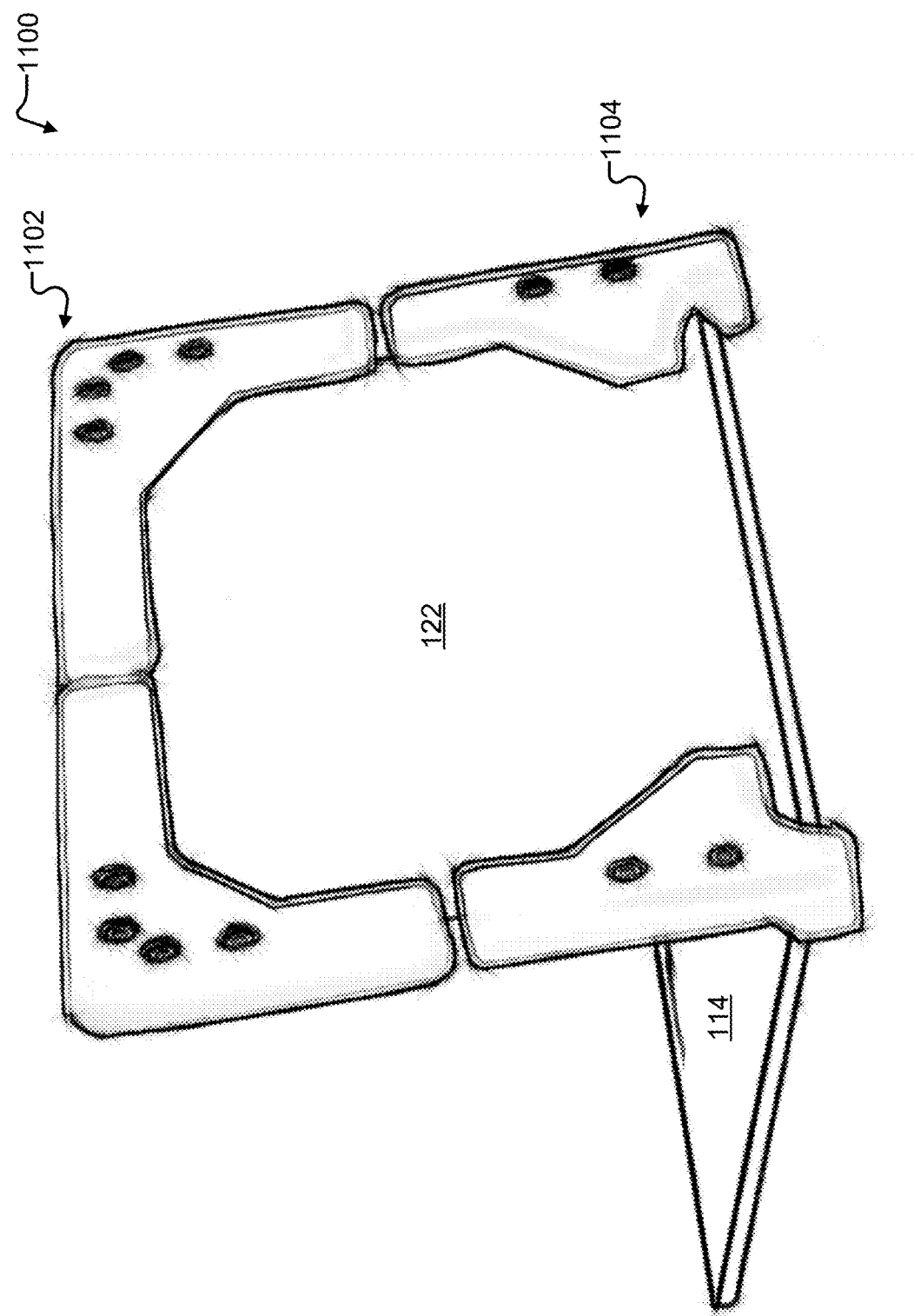
FIG. 11 illustrates a system for protecting an electronic device, according to an exemplary embodiment of the present invention.
Figure 12:
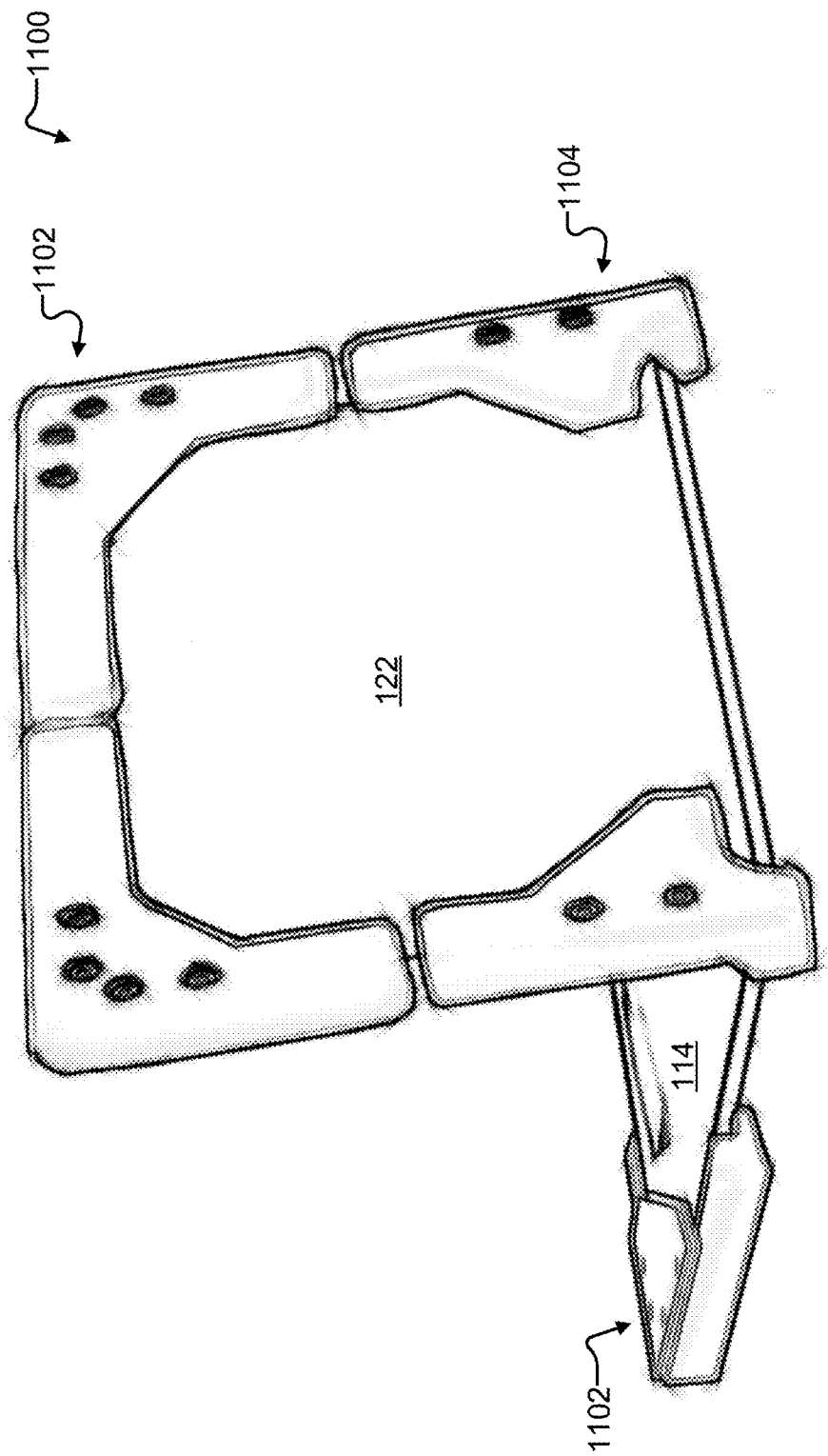
FIG. 12 illustrates a system for protecting an electronic device, according to an exemplary embodiment of the present invention.
Figure 13:
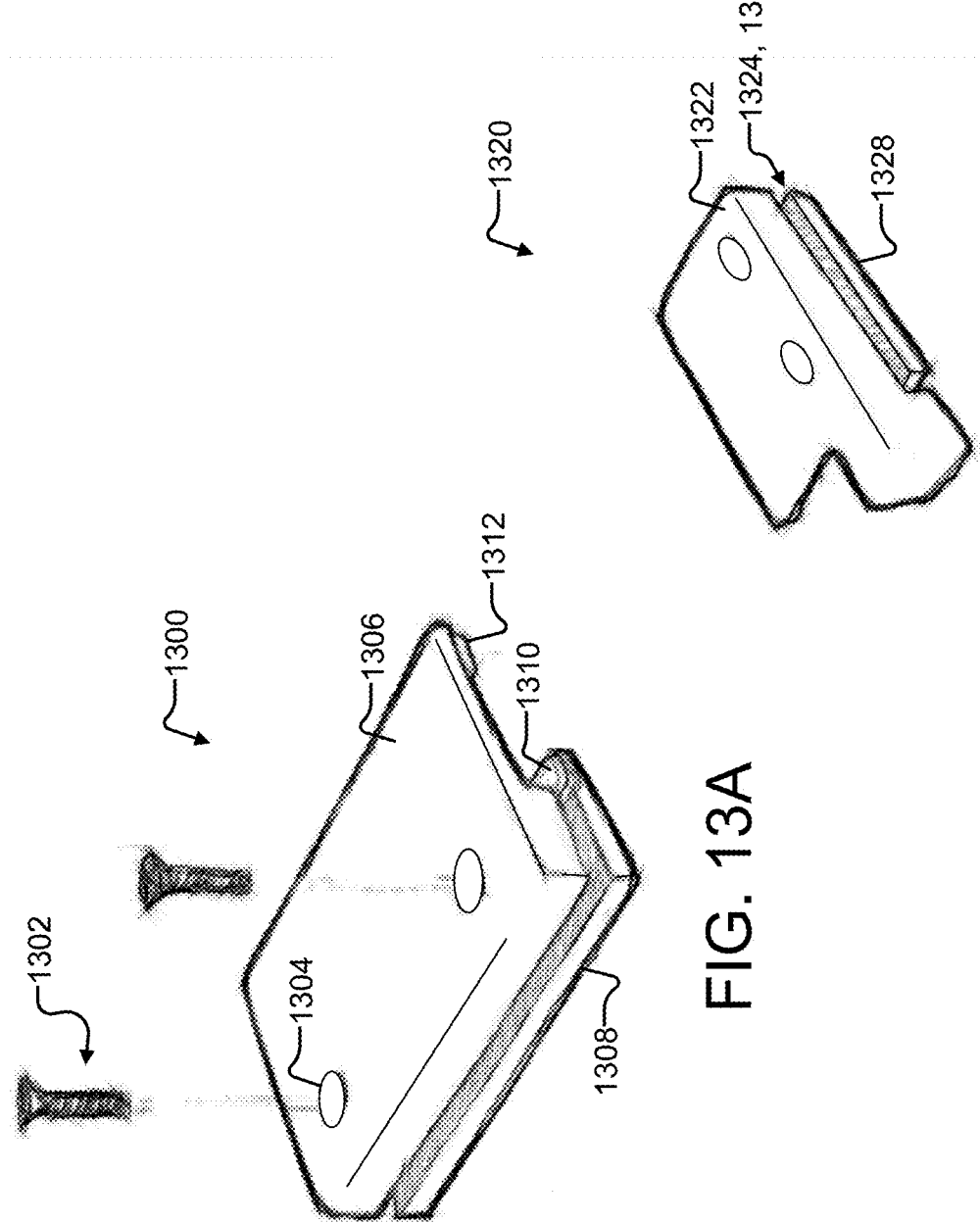
FIG. 13A illustrates a device for protecting an electronic device, according to an exemplary embodiment of the present invention.
FIG. 13B illustrates a device for protecting an electronic device, according to an exemplary embodiment of the present invention.

FIGS. 11 and 12 illustrate a system 1100 for protecting an electronic device 100, according to an exemplary embodiment of the present invention. As shown, overmolded protective devices 1102, 1104 have been positioned about the laptop and clamped down onto its housing. The devices 1102, 1104 are substantially similar to devices 302, 304 with the addition of a soft, pliable exterior.

FIGS. 13A and 13B illustrates additional devices 1300 add 1320 for protecting an electronic device 100, according to an exemplary embodiment of the present invention. The device 1300 includes an outer protective member 1306 and inner protective member 1308.

The device 1300 may be clamped down onto an electronic device using fasteners 1302 arranged in countersunk through holes 1304 and associated threaded holes on the inner protective member 1308. The device 1300 also includes first and second protective films 1310, 1312, respectively. Each of the first and second protective films 1310, 1312 may be attached to inner surfaces of the device 1300 to help in reducing scratches or scuffs.

The device 1320 includes an outer protective member 1322 and inner protective member 1328. The device 1320 may be clamped down onto an electronic device using fasteners 1302 arranged in countersunk through holes 1304 and associated threaded holes on the inner protective member 1328. The device 1320 also includes first and second protective films 1324, 1326, respectively. Each of the first and second protective films 1324, 1326 may be attached to inner surfaces of the device 1320 to help in reducing scratches or scuffs. In further aspects, one or more surfaces of the device can comprise a gripping portion or layer. In yet further aspects, the gripping portion can be a surface treatment or a layer disposed on a surface of the device. In still further aspects, the gripping portion can be comprised of any suitable high-friction material, such as, for example, a compressible material, rubber, high density cushioning foam, foam and or other material adapted for gripping. In some aspects, the gripping portion may comprise grooves or surface pattern to provide traction or grip. In some aspects, the gripping portion may have surface grooves or patterns to minimize the use of materials to only the essential areas that come in contact with the mobile device.

D. Device and System Operation

Also disclosed herein are methods of using a disclosed protective device and system. For example, in another exemplary aspect, the present disclosure provides a method of protecting electronic devices using one or more disclosed protective devices and systems. In further aspects, the methods may include one or more of the following general step: positioning one or more protective devices, as defined herein, about a portion of the electronic device; tightening fasteners or securing mechanism in the one or more protective devices until the one or more protective devices clamp down upon, and are secured to, a body or housing of the electronic device; and using the electronic device normally.

Figure 14:
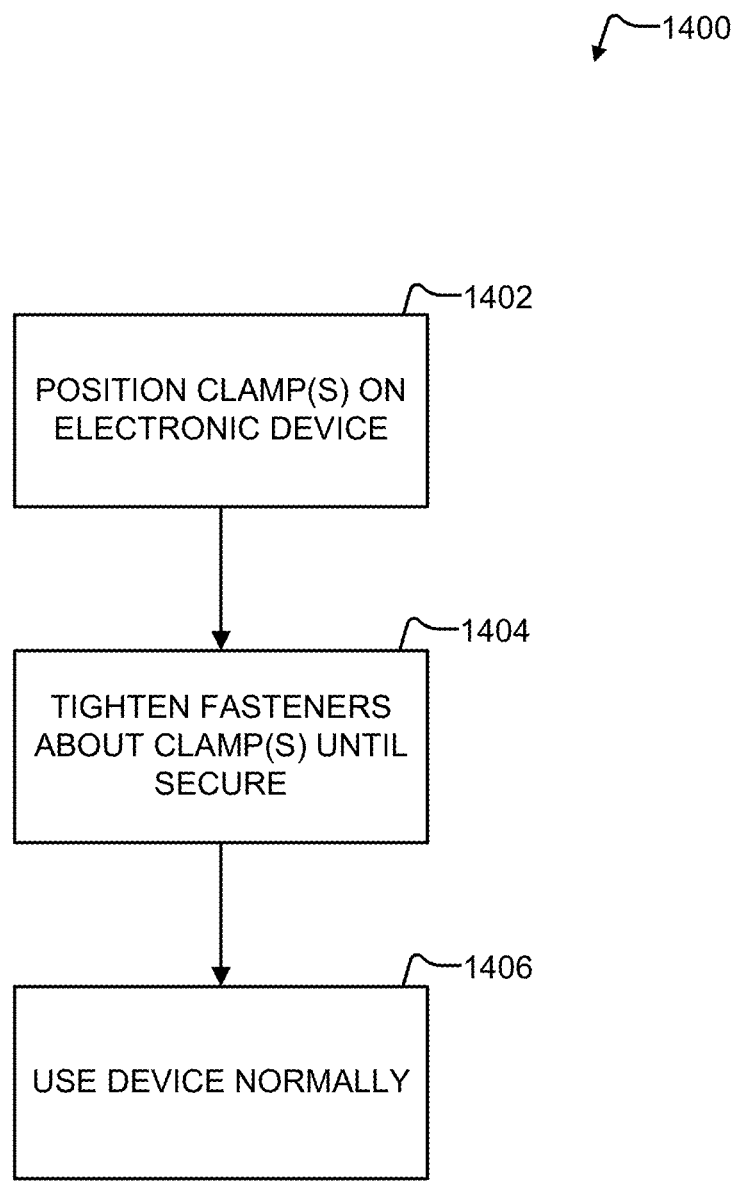
FIG. 14 is a flowchart of a method for protecting an electronic device, according to an exemplary embodiment of the present invention.

Hereinafter, methods of using these devices are described with reference to FIG. 14. FIG. 14 is a flow chart setting forth general stages involved in a method 1400 consistent with an embodiment of the disclosure for operating the disclosed devices and systems. Method 1000 may be implemented using, at least in part, the devices and systems as described in more detail with respect to FIGS. 1-13.

The method 1400 may include positioning one or more protective devices, at block 1402. The one or more protective devices may be positioned about a portion of the electronic device. For example, FIG. 8 illustrates several protective devices positioned about the laptop 100.

The method 1400 further includes tightening fasteners in the one or more protective devices until the one or more protective devices clamp down upon, and are secured to, a body or housing of the electronic device, at block 1404. For example, a tool may be used to securely tighten fasteners in each protective device.

In this manner, if a user wishes to remove device protection, the tool must be used again, thereby reducing a possibility that a user unintentionally removes the devices. Furthermore, the securely tightened fasteners ensure the device is protected even during very long falls or drops. Finally, the method 1400 using the newly protected electronic device normally, at block 1406.

E. Claims

The present invention includes at least the following aspects: Aspect 1: A device for protecting an electronic device, the device comprising: a protective assembly comprising an outer protective member configured to detachably couple with an inner protective member, the outer protective member configured to at least partially envelop a first surface of the electronic device, the outer protective member including a primary inner surface configured to contact said first surface and a secondary inner surface adjacent to the primary inner surface and configured to contact or connect with an inner surface of the inner protective member, and a notch configured to receive at least a portion of the first surface.

Aspect 2: The device of any preceding aspect, wherein a primary inner surface corresponds to a surface of the notch of the outer protective member.

Aspect 3: The device of any preceding aspect, wherein each protective member comprises at least one through hole extending therethrough.

Aspect 4: The device of any preceding aspect, wherein the outer protective member comprises at least one through hole extending therethrough.

Aspect 5: The device of any preceding aspect, wherein the at least one through hole is substantially orthogonal to a secondary inner surface of the outer protective member.

Aspect 6: The device of any preceding aspect, wherein the notch comprises the primary inner surface.

Aspect 7: The device of any preceding aspect, further comprising at least one protective film attached to one or more inner surfaces of one or more protective members.

Aspect 8: The device of any preceding aspect, further comprising a first layer of protective film attached to the primary inner surface of the outer protective member.

Aspect 9: The device of any preceding aspect, wherein a portion of the inner surface of the inner protective member is adjacent to the secondary inner surface of the outer protective member, Aspect 10: The device of any preceding aspect, wherein a remaining portion of the inner surface is adjacent to a surface of the electronic device.

Aspect 11: The device of any preceding aspect, wherein the inner protective member comprises at least one threaded hole extending therethrough, wherein the at least one threaded hole is in alignment with the at least one through hole, and Aspect 12: The device of any preceding aspect, wherein the inner protective surface further comprises a second layer of protective film attached to the inner surface of the inner protective member.

Aspect 13: The device of any preceding aspect, wherein the inner surface of the inner protective member is planar or substantially planar.

Aspect 14: The device of any preceding aspect, wherein the inner protective member comprises a primary inner surface configured to contact a surface of the electronic device and a secondary inner surface adjacent to said primary inner surface and configured to contact or connect with a secondary inner surface of an outer protective member.

Aspect 15: The device of any preceding aspect, wherein a portion of the inner surface of the inner protective member and a portion of the inner surface of the outer protective member are configured to couple when the said inner and outer protective members are connected to one another.

Aspect 16: The device of any preceding aspect, wherein a secondary inner surface of the inner protective member is configured to be disposed against a secondary inner surface of the outer protective member when the said inner and outer protective members are connected to one another.

Aspect 17: The device of any preceding aspect, wherein an entire or substantially entire face of a secondary inner surface of the inner protective member is configured to be disposed against an entire or substantially entire secondary inner surface of the outer protective member when the said inner and outer protective members are connected to one another.

Aspect 18: The device of any preceding aspect, wherein when the said inner and outer protective members are connected to one another is when the said inner and outer protective members are connected to one another and installed on the electronic device.

Aspect 19: The device of any preceding aspect, wherein the portion of the inner surface of the inner protective member and the portion of the inner surface of the outer protective member that are configured to couple further comprise a connecting means or connecting mechanism disposed on both portions.

Aspect 20: The device of any preceding aspect, wherein the connecting mechanism comprises an interlocking mechanism or magnets.

Aspect 21: The device of any preceding aspect, wherein the interlocking mechanism comprise interlocking nodes, snap fit fasteners, a tongue and groove surface construction, or the like.

Aspect 22: The device of any preceding aspect, wherein the connecting mechanism is configured to interlock effective to hold or strengthen coupled inner and outer protective member during installation on the electronic device.

Aspect 23: The device of any preceding aspect, wherein the device is configured to be cut or sized reduced for customization purposes.

Aspect 24: The device of any preceding aspect, inner surface comprises a electrostatic discharges (ESD) material between clamping portion to protect the electronic device from static.

Aspect 25: The use of magnets should be an option for holding the edges together, clamping the top and bottom layer together, and or instead of some small screws in certain functional areas.

Aspect 26: The device of any preceding aspect, further comprising a band configured to connect adjacent protective members.

Aspect 27: The device of any preceding aspect, wherein the band is configured to connect adjacent inner and outer protective members.

Aspect 28: adjacent protective members wherein the band is configured to wrap around edged to strengthen hold together once inner and outer protective members are clamped to the electronic device.

Aspect 29: A device for protecting an electronic device, the device comprising: an outer protective member configured to at least partially envelop a first corner of the electronic device, the outer protective member comprising: at least one through hole extending therethrough, wherein the at least one through hole is substantially orthogonal to a secondary inner surface of the outer protective member, a notch configured to receive a portion of the first corner, wherein the notch is proximate the primary inner surface, a primary inner surface of the outer protective member, the secondary inner surface of the outer protective member, and a first layer of protective film attached to the primary inner surface adjacent the notch; and an inner protective member configured to be attached to the outer protective member comprising: an inner surface of the inner protective member, wherein a portion of the inner surface of the inner protective member is adjacent the secondary inner surface of the outer protective member, wherein a remaining portion of the inner surface is adjacent a surface of the electronic device, at least one threaded hole extending therethrough, wherein the at least one threaded hole is in alignment with the at least one through hole, and a second layer of protective film attached to the inner surface of the inner protective member.

Aspect 30: The device of any preceding aspect, wherein the thickness of the secondary inner surface of the outer protective member is sized to be greater than the thickness of the primary inner surface of the outer protective member.

Aspect 31: The device of any preceding aspect, wherein the inner protective member comprises uniform thickness.

Aspect 32: The device of any preceding aspect, wherein the primary inner surface of the outer protective member comprises uniform thickness.

Aspect 33: The device of any preceding aspect, wherein the secondary inner surface of the outer protective member comprises uniform thickness.

Aspect 34: The device of any preceding aspect, wherein a thickness of the inner protective member is sized to fit within a gap formed between clamshell halves of a laptop computer device.

Aspect 35: The device of any preceding aspect, wherein a thickness of the notch is dimensioned to accept the thickness of a screen portion of a laptop computer device.

Aspect 36: The device of any preceding aspect, further comprising a fastener positioned in the through hole and threaded into the threaded hole.

Aspect 37: The device of any preceding aspect, wherein the through hole and the threaded hole are configured to receive a fastener.

Aspect 38: The device of any preceding aspect, wherein the fastener comprises at least one of the following: a countersunk screw, a counterbore screw, and a bolt.

Aspect 39: The device of any preceding aspect, wherein the at least one through hole is countersunk.

Aspect 40: The device of any preceding aspect, wherein the inner protective member is formed of molded plastic.

Aspect 41: The device of any preceding aspect, wherein the outer protective member comprises an overmolded portion.

Aspect 42: The device of any preceding aspect, wherein the outer protective member comprises a soft or pliable outer layer.

Aspect 43: The device of any preceding aspect, wherein the outer protective member is formed of at least one of the following: aluminum, plastic, and combinations thereof.

Aspect 44: The device of any preceding aspect, wherein the first and second protective films comprise at least one of the following: rubberized tape, elastomeric, electrostatic discharge (ESD) safe material, plastic tape, and felt tape.

Aspect 45: The device of any preceding aspect, wherein a portion of the secondary inner surface of the outer protective member is configured to connect to the first corner of the electronic device.

Aspect 46: The device of any preceding aspect, wherein an edge of the notch is configured to be flush against the first corner of the electronic device.

Aspect 47: The device of any preceding aspect, wherein the notch is dimensioned to accept a plurality of corners and edges of a plurality of different models of electronic devices.

Aspect 48: The device of any preceding aspect, wherein the outer protective member and the inner protective member are configured to be clamped down onto a clamshell half of a laptop computer device.

Aspect 49: The device of any preceding aspect, wherein the outer protective member and the inner protective member are configured to be clamped down onto a tablet computer, cell phone, or portable computer apparatus.

Aspect 50: The device of any preceding aspect, wherein when the laptop computer device is in a closed position, the inner protective member is configured to be between the clamshell halves of the laptop computer device.

Aspect 51: The device of any preceding aspect, wherein the outer protective member and the inner protective member comprise a plurality of interlocking means.

Aspect 52: The device of any preceding aspect, wherein the plurality of interlocking means are configured to secure the outer protective member to the inner protective member.

Aspect 53: The device of any preceding aspect, wherein the outer protective member and the inner protective member comprise a plurality of magnets.

Aspect 54: The device of any preceding aspect, wherein the plurality of magnets are configured to secure the outer protective member to the inner protective member.

Aspect 55: The device of any preceding aspect, wherein the device is configured to be installed on a corner edge of the electronic device and/or non-corner edge of the device.

Aspect 56: A system for protecting an electronic device, comprising:

A plurality of protective devices comprising: an outer protective member comprising: at least one through hole extending therethrough, wherein the at least one through hole is substantially orthogonal to a secondary inner surface of the outer protective member, a notch configured to receive a portion of the first electronic device, wherein the notch is proximate the primary inner surface, a primary inner surface of the outer protective member, the secondary inner surface of the outer protective member, and a first layer of protective film attached to the primary inner surface adjacent the notch; and at least one inner protective member configured to be attached to the outer protective member comprising: an inner surface of the inner protective member, wherein a portion of the inner surface of the inner protective member is adjacent the secondary inner surface of the outer protective member, wherein a remaining portion of the inner surface is adjacent a surface of the electronic device, at least one threaded hole extending therethrough, wherein the at least one threaded hole is in alignment with the at least one through hole, and a second layer of protective film attached to the inner surface of the inner protective member, wherein at least one of the plurality of protective devices is configured to at least partially envelop a corner of the electronic device, wherein at least one of the plurality of protective devices is configured to at least partially envelop a side portion of the electronic device.

Aspect 57: The system of any preceding aspect, wherein the at least one of the plurality of protective devices configured to at least partially envelop a corner of the electronic device is configured to connect to the at least one of the plurality of protective devices configured to at least partially envelop a side portion of the electronic device when the electronic device is in a folded position.

Aspect 58: The system of any preceding aspect, further comprising four (4) protective devices.

Aspect 59: The system of any preceding aspect, further comprising six (6) protective devices.

Aspect 60: A method of protecting an electronic device, comprising: positioning one or more protective devices, as defined in any preceding aspect, about a portion of the electronic device; tightening fasteners in the one or more protective devices until the one or more protective devices clamp down upon, and are secured to, a body or housing of the electronic device; and using the electronic device normally.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for protecting an electronic device, the device comprising:
a protective assembly comprising an outer protective member configured to detachably couple with an inner protective member,
the outer protective member configured to at least partially envelop a first surface of the electronic device, the outer protective member including:
a primary inner surface configured to contact the first surface of the electronic device,
a secondary inner surface adjacent to the primary inner surface and configured to contact or connect with an inner surface of the inner protective member,
a notch configured to receive at least a portion of the first surface of the electronic device, and
at least one through hole substantially orthogonal to the secondary inner surface of the outer protective member;
wherein the primary inner surface of the outer protective member corresponds to a surface of the notch of the outer protective member.

2. The device of claim 1, wherein the notch comprises the primary inner surface.

3. The device of claim 2, further comprising at least one protective film attached to at least one of: the primary inner or secondary inner surfaces of the outer protective member or the inner surface of the inner protective member.

4. The device of claim 1, wherein the at least one protective film comprises a first layer of protective film attached to the primary inner surface of the outer protective member.

5. The device of claim 4, wherein the at least one protective film further comprises a second layer of protective film attached to the inner surface of the inner protective member.

6. The device of claim 1, wherein the inner protective member comprises at least one threaded hole extending therethrough, wherein the at least one threaded hole is in alignment with the at least one through hole.

7. The device of claim 1, wherein the inner surface of the inner protective member comprises
a primary inner surface configured to contact a second surface of the electronic device and
a secondary inner surface adjacent to said primary inner surface and configured to contact or connect with the secondary inner surface of the outer protective member.

8. The device of claim 7, wherein an entire or substantially entire face of the secondary inner surface of the inner protective member is configured to be disposed against an entire or substantially entire secondary inner surface of the outer protective member when the inner and outer protective members are connected to one another.

9. The device of claim 1, wherein a portion of the inner surface of the inner protective member and a portion of the secondary inner surface of the outer protective member are configured to couple when the inner and outer protective members are connected to one another.

10. The device of claim 1, wherein the inner and outer protective members are configured to be connected to one another when installed on the electronic device.

11. The device of claim 1, wherein of the inner protective member and the outer protective member are configured to couple using an interlocking mechanism.

12. The device of claim 11, wherein the interlocking mechanism comprises a screw or a magnet, or a combination thereof.

13. The device of claim 1, further comprising a plurality of protective assemblies.

14. A device for protecting an electronic device, the device comprising:
an outer protective member configured to at least partially envelop a first corner of the electronic device, the outer protective member comprising:
a primary inner surface,
a secondary inner surface adjacent to the primary inner surface,
at least one through hole extending therethrough the outer protective member,
wherein the at least one through hole is substantially orthogonal to the secondary inner surface of the outer protective member,
a notch configured to receive a portion of the first corner of the electronic device, the notch being proximate to the primary inner surface, and
a first layer of protective film attached to the primary inner surface adjacent the notch; and
an inner protective member configured to be attached to the outer protective member comprising:
an inner surface,
wherein a first portion of the inner surface of the inner protective member is correspondingly adjacent the secondary inner surface of the outer protective member,
wherein a remaining portion of the inner surface of the inner protective member is correspondingly adjacent a surface of the electronic device,
at least one threaded hole extending therethrough the inner protective member,
wherein the at least one threaded hole is in alignment with the at least one through hole of the outer protective member, and
a second layer of protective film attached to the inner surface of the inner protective member.

15. The device of claim 14, wherein the thickness of the secondary inner surface of the outer protective member is sized to be greater than the thickness of the primary inner surface of the outer protective member.

16. The device of claim 14, wherein a thickness of the inner protective member is sized to fit within a gap formed between clamshell halves of a laptop computer device, and wherein when the laptop computer device is in a closed position, the inner protective member is configured to be between the clamshell halves of the laptop computer device.

17. A system for protecting an electronic device, comprising:
a plurality of protective devices comprising:
an outer protective member comprising:
a primary inner surface,
a secondary inner surface adjacent to the primary inner surface,
at least one through hole extending therethrough the outer protective member, wherein the at least one through hole is substantially orthogonal to the secondary inner surface of the outer protective member, a notch configured to receive a portion of the first corner of the electronic device, the notch being proximate to the primary inner surface; and at least one inner protective member configured to be attached to the outer protective member comprising:

an inner surface, wherein a first portion of the inner surface of the inner protective member is correspondingly adjacent the secondary inner surface of the outer protective member, wherein a remaining portion of the inner surface of the inner protective member is correspondingly adjacent a surface of the electronic device, at least one threaded hole extending therethrough the inner protective member, wherein the at least one threaded hole is in alignment with the at least one through hole of the outer protective member;

wherein at least one of the plurality of protective devices is configured to at least partially envelop a corner of the electronic device;

wherein at least one of the plurality of protective devices is configured to at least partially envelop a side portion of the electronic device.

18. The system of claim 17, wherein at least one of the plurality of protective devices is configured to at least partially envelop a corner of a laptop computer device, and wherein at least one of the plurality of protective devices is configured to at least partially envelop a side portion of the laptop computer device when the laptop computer device is in a closed position.

19. The system of claim 17, wherein the system comprises at least four (4) protective devices.

20. The system of claim 17, wherein the system comprises at least six (6) protective devices.

* * * * *